US010954677B1

(12) United States Patent
Scanlin

(10) Patent No.: US 10,954,677 B1
(45) Date of Patent: Mar. 23, 2021

(54) CONNECTED MOULDING FOR USE IN SMART BUILDING CONTROL

(71) Applicant: SCANALYTICS, INC., Milwaukee, WI (US)

(72) Inventor: Joseph Scanlin, Milwaukee, WI (US)

(73) Assignee: Scanalytics, Inc., Milwaukee, WI (US)

(*) Notice: Subject to any disclaimer, the term of this patent is extended or adjusted under 35 U.S.C. 154(b) by 0 days.

(21) Appl. No.: 16/696,802

(22) Filed: Nov. 26, 2019

(51) Int. Cl.
E04F 15/02 (2006.01)
G01D 11/24 (2006.01)
E04F 19/02 (2006.01)
E04F 13/074 (2006.01)
E04F 19/04 (2006.01)
E04B 5/43 (2006.01)
F24F 120/10 (2018.01)
G21F 7/02 (2006.01)

(52) U.S. Cl.
CPC ............ E04F 15/02 (2013.01); E04B 5/43 (2013.01); E04F 13/074 (2013.01); E04F 19/02 (2013.01); E04F 19/04 (2013.01); G01D 11/245 (2013.01); G21F 7/02 (2013.01); E04F 2290/02 (2013.01); F24F 2120/10 (2018.01)

(58) Field of Classification Search
CPC ..... E04F 19/02; E04F 19/04; E04F 2019/044; E04F 13/074; E04F 2290/02; E04F 15/02; H02G 3/00; H04W 4/025; H04W 4/029; H04W 64/00; G01D 11/245; F24F 2120/10; G08B 13/10; E04B 5/43
See application file for complete search history.

(56) References Cited

U.S. PATENT DOCUMENTS

| 6,515,586 | B1* | 2/2003 | Wymore | G08B 13/10 340/541 |
| 7,978,090 | B2* | 7/2011 | Brooks | G08B 13/10 340/665 |
| 9,370,125 | B2* | 6/2016 | Abuelsaad | G05D 23/1934 |
| 10,321,275 | B1* | 6/2019 | Orlov | G01S 13/878 |
| 10,381,774 | B2* | 8/2019 | Krize | H01R 25/006 |
| 10,469,590 | B2* | 11/2019 | Scanlin | H04L 67/125 |
| 2006/0202832 | A1* | 9/2006 | Reznik | G06K 7/10346 340/572.7 |
| 2007/0069021 | A1* | 3/2007 | Elrod | G06K 17/00 235/451 |
| 2009/0273472 | A1* | 11/2009 | Brooks | G08B 13/10 340/541 |
| 2014/0307118 | A1* | 10/2014 | MacKinnon | A61B 5/112 348/222.1 |
| 2016/0056629 | A1* | 2/2016 | Baker | H05B 47/105 700/276 |
| 2018/0241186 | A1* | 8/2018 | Gibboney, Jr. | H02G 3/0425 |
| 2018/0313558 | A1* | 11/2018 | Byers | E04B 9/04 |
| 2019/0208018 | A1* | 7/2019 | Scanlin | G05B 19/042 |
| 2019/0208019 | A1* | 7/2019 | Scanlin | F24F 11/63 |
| 2020/0028915 | A1* | 1/2020 | Scanlin | G05B 19/042 |

* cited by examiner

Primary Examiner — Andrew J Triggs
(74) Attorney, Agent, or Firm — Dickinson Wright, PLLC; Stephen A. Mason; Jonathan H. Harder

(57) ABSTRACT

In some embodiments, a system includes a set of moulding sections, at least one electrical conductor affixed at least partially within one or more of the set of moulding sections, and one or more joints between various ones of the set of moulding sections. At least some of the one or more joints are arranged to preserve electrical conductivity, via the at least one electrical conductor, between the various ones of the set of moulding sections.

17 Claims, 8 Drawing Sheets

← 500

| GRAPHIC LAYER
505 |
|---|
| STRUCTURAL LAYER
510 |
| CONDUCTIVE LAYER (CONDUCTORS ALONG FIRST AXIS)
515 |
| RESISTIVE LAYER
520 |
| CONDUCTIVE LAYER (CONDUCTORS ALONG SECOND AXIS)
525 |
| STRUCTURAL LAYER
530 |
| GLUE BACKING
535 |

CONNECTED MOULDING FOR USE IN SMART BUILDING CONTROL

TECHNICAL FIELD

This disclosure relates to mouldings. More specifically, this disclosure relates to systems and methods for connected mouldings for use in smart building control.

BACKGROUND

"Smart Buildings," or buildings comprising physical spaces whose environmental control systems, such as lights, HVAC systems, and physical features (for example, ceiling fans or window shades) operate, at least in part, based on control inputs generated by the computerized application of predetermined rules to sensor data, offer tremendous promise in terms of improving how humans use physical spaces. For example, truly intelligent control of heating and lighting systems offers the possibility of significant improvements in energy efficiency beyond those attainable through passive structural improvements such as better insulation. However, a "smart building" is only as "smart" as the sensors are able to provide accurate and meaningful inputs to the algorithms for controlling parameters of the building's physical spaces. Some embodiments according to this disclosure address technical problems associated with generating truly "smart" control inputs for environmental control systems.

SUMMARY

In one embodiment, a system includes a set of moulding sections, at least one electrical conductor affixed at least partially within one or more of the set of moulding sections, and one or more joints between various ones of the set of moulding sections. At least some of the one or more joints may be arranged to preserve electrical conductivity, via the a least one electrical conductor, between the various ones of the set of moulding sections;

In one embodiment, a system may include processing device communicatively coupled to a memory device storing instructions, and the processing device may execute the instructions to perform any of the operations discussed above. In one embodiments, a tangible, non-transitory computer-readable medium may store instructions that, when executed, cause a processing device to perform any of the operations discussed above.

In one embodiment, a system may include a set of moulding sections, at least one communication cable affixed at least partially within one or more of the set of moulding sections, and one or more joints between various ones of the set of moulding sections At least some of the one or more joints may be arranged to preserve communications connectivity between the various ones of the set of moulding sections.

In some embodiments, methods of tracking movement using various moulding section sensor data and/or tile impression data are described herein. In some embodiments, tangible, non-transitory computer-readable media is disclosed that stores instructions that, when executed, cause a processing device to perform any combination of operations in methods described herein.

Other technical features may be readily apparent to one skilled in the art from the following figures, descriptions, and claims.

BRIEF DESCRIPTION OF THE DRAWINGS

For a detailed description of example embodiments, reference will now be made to the accompanying drawings in which:

FIG. 5 illustrates aspects of a smart floor tile according to certain embodiments of this disclosure;

NOTATION AND NOMENCLATURE

Figure 1A:
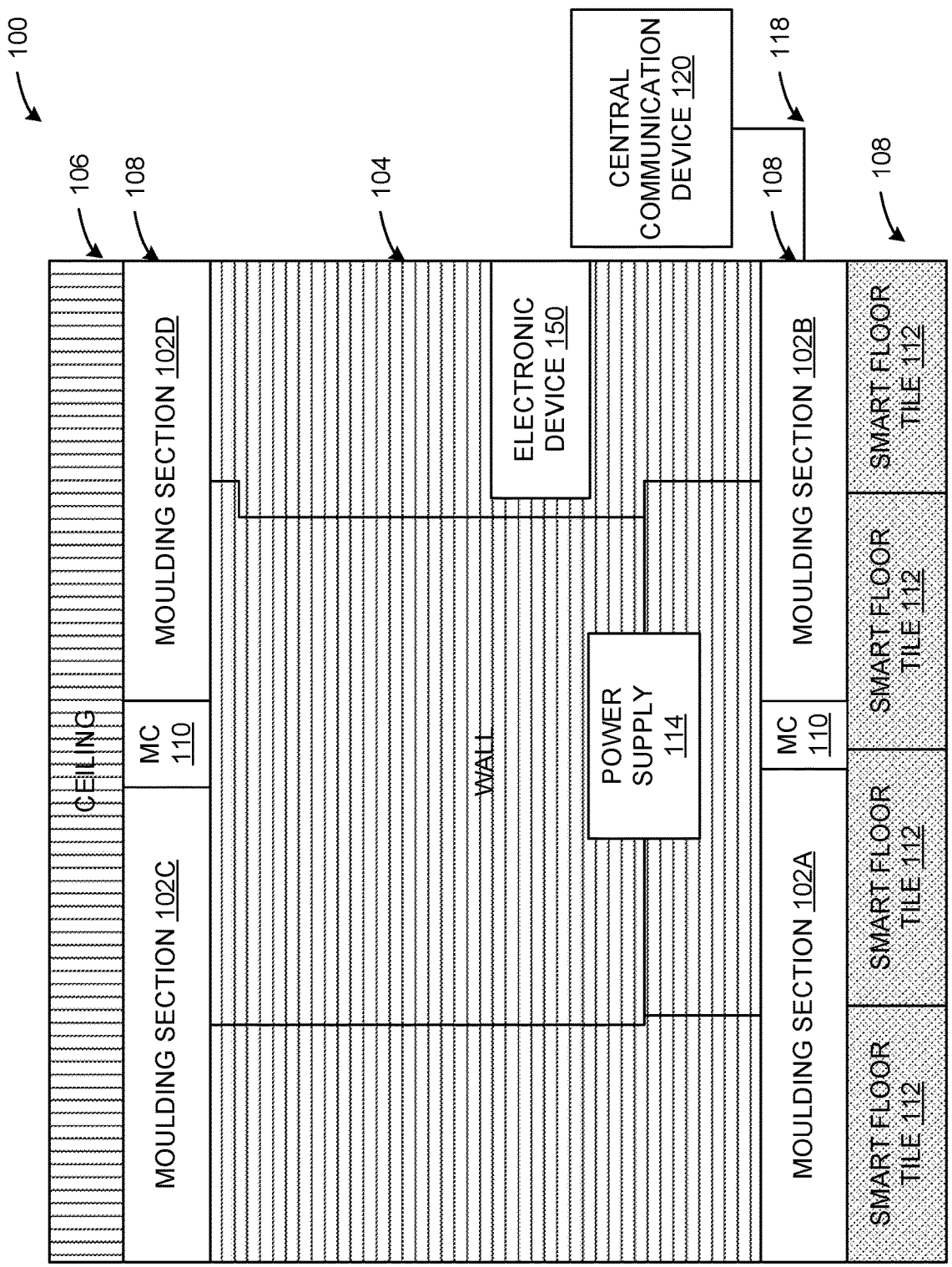
FIGS. 1A-1C illustrate various example configurations of moulding sections according to certain embodiments of this disclosure.

Various terms are used to refer to particular system components. Different entities may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

Various terms are used to refer to particular system components. Different entities may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

The terminology used herein is for the purpose of describing particular example embodiments only, and is not intended to be limiting. As used herein, the singular forms "a," "an," and "the" may be intended to include the plural forms as well, unless the context clearly indicates otherwise. The method steps, processes, and operations described herein are not to be construed as necessarily requiring their performance in the particular order discussed or illustrated, unless specifically identified as an order of performance. It is also to be understood that additional or alternative steps may be employed.

The terms first, second, third, etc. may be used herein to describe various elements, components, regions, layers and/or sections; however, these elements, components, regions, layers and/or sections should not be limited by these terms. These terms may be only used to distinguish one element, component, region, layer or section from another region, layer or section. Terms such as "first," "second," and other numerical terms, when used herein, do not imply a sequence or order unless clearly indicated by the context. Thus, a first element, component, region, layer or section discussed below could be termed a second element, component, region, layer or section without departing from the teachings of the example embodiments. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. In another example, the phrase "one or more" when used with a list of items means there may be one item or any suitable number of items exceeding one.

Spatially relative terms, such as "inner," "outer," "beneath," "below," "lower," "above," "upper," "top," "bottom," and the like, may be used herein. These spatially relative terms can be used for ease of description to describe one element's or feature's relationship to another element(s) or feature(s) as illustrated in the figures. The spatially relative terms may also be intended to encompass different orientations of the device in use, or operation, in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptions used herein interpreted accordingly.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), solid state drives (SSDs), flash memory, or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

The term "moulding" may be spelled as "molding" herein.

DETAILED DESCRIPTION

The following discussion is directed to various embodiments of the disclosed subject matter. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

FIGS. 1A through 6, discussed below, and the various embodiments used to describe the principles of this disclosure in this patent document are by way of illustration only and should not be construed in any way to limit the scope of the disclosure.

Embodiments as disclosed herein relate to connected moulding for use in smart building control. The advent of the internet of things and development of physical spaces whose environmental control systems (for example, lights and HVAC systems) can be controlled using a broad spectrum of sensor data collected within the physical space presents many opportunities to make buildings "smarter," in the sense of being attuned with, and responsive to, the needs and priorities of the buildings' human occupants. Effective integration of sensor technology and machine intelligence for processing and understanding the sensor data presents opportunities for meaningful improvements across a wide range of building functionalities. For example, such integration can improve the efficiency of a building (for example, by focusing heating and cooling resources on the regions of a building that have the most people), improve a building's safety (for example, by performing object location and/or footstep analysis to identify when an occupant of a building has fallen or stopped walking under circumstances suggesting concern), and extend the life cycle of a building (for example, by collecting data as to loading and use stress over a building's lifespan).

Realizing the full potential of a "smart building" to learn about its occupants and control itself in response to, and in anticipation of, its occupants' needs is enhanced when data regarding a building's utilization is collected from sources that are a constant across the building's lifecycle, and which capture all, or almost all, of the relevant occupant usage data.

The perimeter of a physical space is one example of a source of relevant occupant data. For example, some embodiments include moulding section, such as a crown moulding, a baseboard, a shoe moulding, a door casing, and/or a window casing, that are located around a perimeter of a physical space. The moulding sections may be modular in nature in that the moulding sections may be various different sizes and the moulding sections may be connected with moulding connectors. The moulding connectors may be configured to maintain conductivity between the connected moulding sections. To that end, each moulding section may include various components, such as electrical conductors, sensors, processors, memories, network interfaces, and so forth that enable communicating data, distributing power, obtaining moulding section sensor data, and so forth. The moulding sections may use various sensors to obtain moulding section sensor data including the location of objects in a physical space as the objects move around the physical space. The moulding sections may use moulding section sensor data to determine a path of the object in the physical space and/or to control other electronic devices (e.g., smart shades, smart windows, smart doors, HVAC system, smart lights, and so forth) in the smart building. Accordingly, the moulding sections may be in wired and/or wireless communication with the other electronic devices. Further, the moulding sections may be in electrical communication with a power supply. The moulding sections may be powered by the power supply and may distribute power to smart floor tiles that may also be in electrical communication with the moulding sections.

The floor of a building is another example of a source of relevant occupant data. Similarly, barring unforeseeable changes in human locomotion, humans can be expected to generate measurable interactions with buildings through their footsteps on buildings' floors. Embodiments according to the present disclosure help realize the potential of the "smart building" by providing, amongst other things, control inputs for a building's environmental control systems using directional occupancy sensing based on occupants' interaction with building surfaces, including, without limitation, floors, and/or interaction with a physical space including their location relative to moulding sections.

Figure 1B:
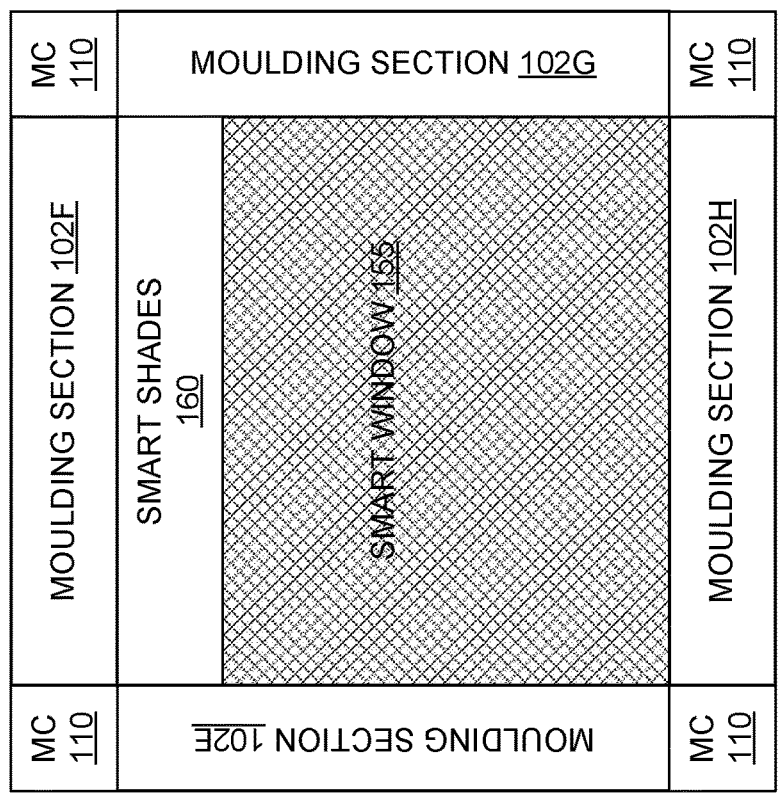

Turning now to the figures, FIGS. 1A-1B illustrate various example configurations of moulding sections 102 according to certain embodiments of this disclosure. FIG. 1A depicts an example system 100 that is used in a physical space of a smart building. The depicted physical space includes a wall 104, a ceiling 106, and a floor 108 that define a room. Numerous moulding sections 102A, 102B, 102C, and 102D are disposed in the physical space. For example, moulding sections 102A and 102B may form a baseboard or shoe moulding that is secured to the wall 108 and/or the floor 108. Moulding sections 102C and 102D may for a crown moulding that is secured to the wall 108 and/or the ceiling 106. Each moulding section 102A may have different shapes and/or sizes.

The moulding sections 102 may each include various components, such as electrical conductors, sensors, processors, memories, network interfaces, and so forth. The electrical conductors may be partially or wholly enclosed within one or more of the moulding sections. For example, one electrical conductor may be a communication cable that is partially enclosed within the moulding section and exposed externally to the moulding section to electrically couple with another electrical conductor in the wall 108. In some embodiments, the electrical conductor may be communicably connected to at least one smart floor tile 112. In some embodiments, the electrical conductor may be in electrical communication with a power supply 114. In some embodiments, the power supply 114 may provide electrical power that is in the form of mains electricity general-purpose alternating current. In some embodiments, the power supply 114 may be a battery, a generator, or the like.

In some embodiments, the electrical conductor is configured for wired data transmission. To that end, in some embodiments the electrical conductor may be communicably coupled via cable 118 to a central communication device 120 (e.g., a hub, a modem, a router, etc.). Central communication device 120 may create a network, such as a wide area network, a local area network, or the like. Other electronic devices 150 may be in wired and/or wireless communication with the central communication device 120. Accordingly, the moulding section 102 may transmit data to the central communication device 120 to transmit to the electronic devices 150. The data may be control instructions that cause, for example, an HVAC system to change an operational parameter based on detection of a person in a room. In some embodiments, the moulding section 102A may be in wired and/or wireless communication connection with the electronic device 150 without the use of the central communication device 120 via a network interface and/or cable. The electronic device 150 may be any suitable electronic device capable of changing an operational parameter in response to a control instruction.

In some embodiments, the electrical conductor may include an insulated electrical wiring assembly. In some embodiments, the electrical conductor may include a communications cable assembly. The moulding sections 102 may include a flame-retardant backing layer. The moulding sections 102 may be constructed using one or more materials selected from: wood, vinyl, rubber, fiberboard, and wood composite materials.

The moulding sections may be connected via one or more moulding connectors 110. A moulding connector 110 may enhance electrical conductivity between two moulding sections 102 by maintaining the conductivity between the electrical conductors of the two moulding sections 102. For example, the moulding connector 110 may include contacts and its own electrical conductor that forms a closed circuit when the two moulding sections are connected with the moulding connector 110. In some embodiments, the moulding connectors 110 may include a fiber optic relay to enhance the transfer of data between the moulding sections 102. It should be appreciated that the moulding sections 102 are modular and may be cut into any desired size to fit the dimensions of a perimeter of a physical space. The various sized portions of the moulding sections 102 may be connected with the moulding connectors 110 to maintain conductivity.

Moulding sections 102 may utilize a variety of sensing technologies, such as proximity sensors, optical sensors, membrane switches, pressure sensors, and/or capacitive sensors, to identify instances of an object proximate or located near the sensors in the moulding sections. Proximity sensors may emit an electromagnetic field or a beam of electromagnetic radiation (infrared, for instance), and identify changes in the field or return signal. The object being sensed may be any suitable object, such as a human, an animal, a robot, furniture, appliances, and the like. Different proximity sensors may be used to detect different objects For example, a capacitive proximity sensor or photoelectric sensor might be suitable for a plastic object, and an inductive proximity sensor may be suitable for a metal target. The sensors in the moulding section may generate moulding section sensor data indicative of the location (presence) of an object, the timestamp of the identified location, the duration of the identified location, and so forth.

The moulding section sensor data may be used alone or in combination with tile impression data generated by the smart floor tiles 112 to perform smart building control using directional occupancy sensing. For example, the moulding section sensor data may be used to determine a control instruction to generate and to transmit to an electric device 150 and/or the smart floor tile 102A. The control instruction may include changing an operational parameter of the electronic device 150 based on the moulding section sensor data indicating the presence or absence of an object for a period of time and/or indicating a path of an object. The control instruction may include instructing the smart floor tile 112 to reset one or more components based on an indication in the moulding section sensor data that the one or more components is malfunctioning and/or producing faulty results.

In some embodiments, the moulding section sensor data can be used to verify the impression tile data is accurate for tracking a path of an object, or vice versa. Such a technique may improve accuracy of the determination. Further, if the moulding section sensor data and the impression data do not align (e.g., the impression data indicates presence of an object and the moulding section sensor data does not indicate presence of the object), then further analysis may be performed. For example, tests can be performed to determine if there are defective sensors at the corresponding smart floor tile 112 and/or the corresponding moulding section 102 that generated the data. Further, control actions may be performed such as resetting one or more components of the moulding section 102 and/or the smart floor tile 112.

FIG. 1B illustrates another configuration of the moulding sections 102. In this example, the moulding sections 102E-102H surround a border of a smart window 155. The moulding sections 102 are connected via the moulding connector 110. As may be appreciated, the modular nature of the moulding sections 102 with the moulding connectors 110 enables forming a square around the window. Other shapes may be formed using the moulding sections 102 and the moulding connectors 110.

The moulding sections 102 may be electrically and/or communicably connected to the smart window via electrical conductors and/or interfaces. The moulding sections 102 may provide power to the smart window 155, receive data from the smart window 155, and/or transmit data to the smart window 155. One example smart window includes the ability to change light properties using voltage that may be provided by the moulding sections 102. The moulding sections 102 may provide the voltage to control the amount of light let into a room based on the occupancy of the room determined via the moulding section sensor data. For example, if the moulding section sensor data indicates a room is rarely inhabited, the moulding sections 102 may instruct the smart window 155 to change a light property to allow light into the room. Such techniques may save money via heating and cooling of an HVAC system and/or prolong the longevity of the HVAC system and/or the smart window 155.

In some embodiments, the moulding sections 102 may use sensors to detect when the smart window 155 is opened. The moulding sections 102 may determine whether the smart window 155 opening is performed at an expected time (e.g., when a home owner is at home) or at an unexpected time (e.g., when the home owner is away from home). The moulding sections 102 may sense the occupancy patterns of certain objects (e.g., people) in the space in which the moulding sections 102 are disposed to determine a schedule of the objects. The schedule may be referenced when determining if an undesired opening (e.g., break-in event) occurs and the moulding sections 102 may be communicatively to an alarm system to trigger the alarm when the certain event occurs.

As depicted, at least moulding section 102F is electrically and/or communicably coupled to smart shades 160. Again, the moulding section 102F may use the moulding section sensor data to control the smart shades 160 to extend or retract to control the amount of light let into a room.

Figure 1C:
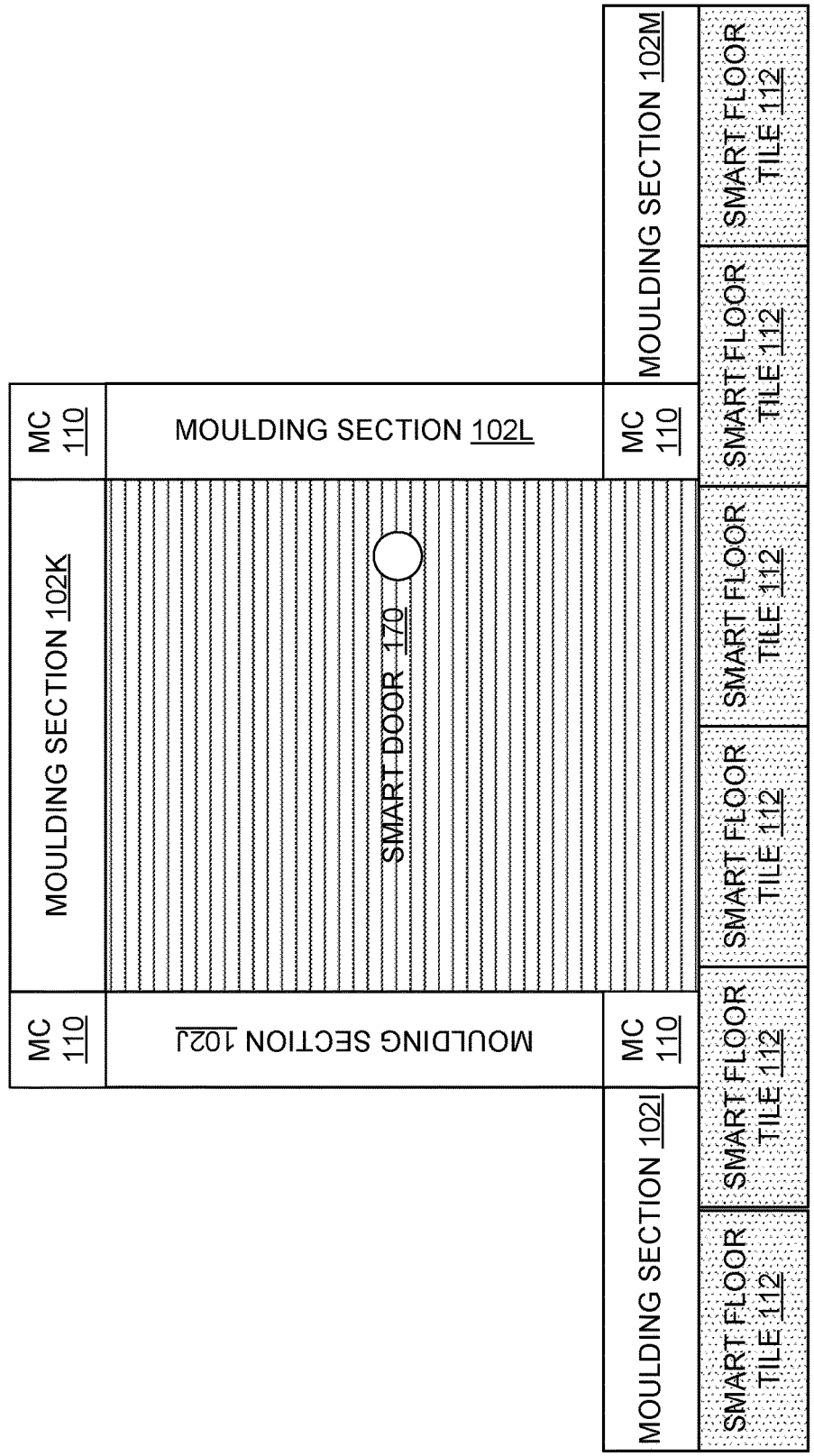

FIG. 1C illustrates another configuration of the moulding sections 102. In this example, the moulding sections 102E-102H surround a majority of a border of a smart door 170. The moulding sections 102J, 102K, and 102L may be electrically and/or communicably connected to the smart door 170 via electrical conductors and/or interfaces. The moulding sections 102 may provide power to the smart door 170, receive data from the smart door 170, and/or transmit data to the smart door 170. In some embodiments, the moulding sections 102 may control operation of the smart door 170. For example, if the moulding section sensor data indicates that no one is present in a house for a certain period of time, the moulding sections 102 may determine a locked state of the smart door 170 and generate and transmit a control instruction to the smart door 170 to lock the smart door 170 if the smart door 170 is in an unlocked state.

Figure 2:
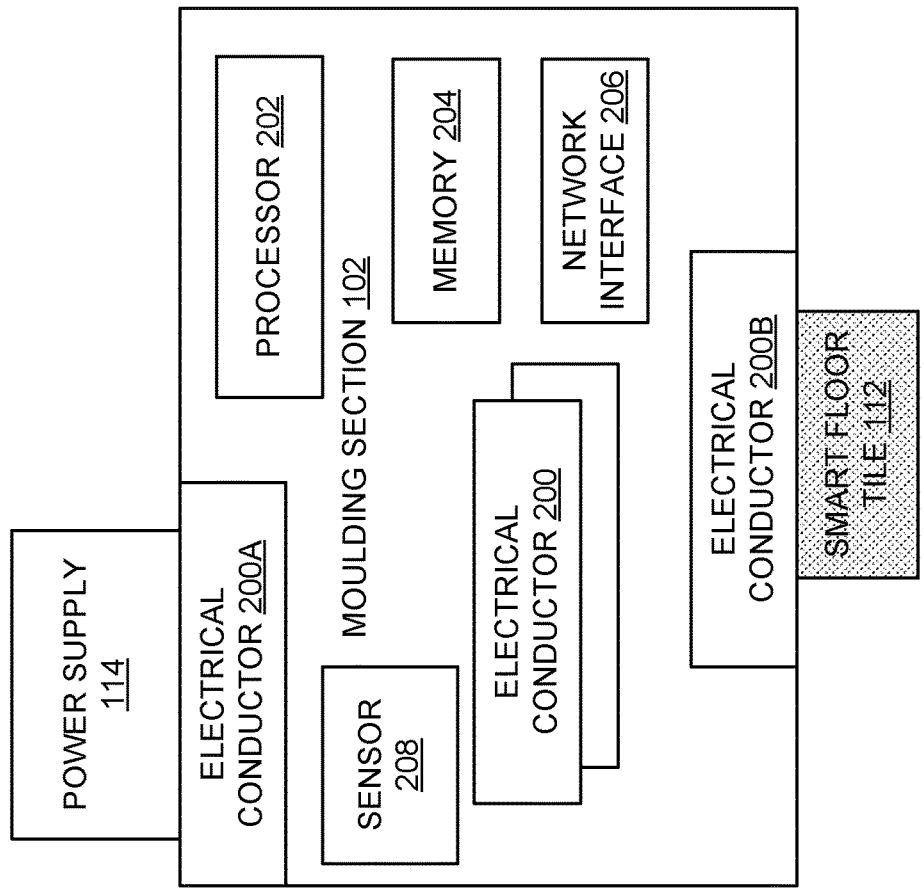
FIG. 2 illustrates an example component diagram of a moulding section according to certain embodiments of this disclosure.

FIG. 2 illustrates an example component diagram of a moulding section 102 according to certain embodiments of this disclosure. As depicted, the moulding section 102 includes numerous electrical conductors 200, a processor 202, a memory 204, a network interface 206, and a sensor 208. More or fewer components may be included in the moulding section 102. The electrical conductors may be insulated electrical wiring assemblies, communications cable assemblies, power supply assemblies, and so forth. As depicted, one electrical conductor 200A may be in electrical communication with the power supply 114, and another electrical conductor 200B may be communicably connected to at least one smart floor tile 112.

In various embodiments, the moulding section 102 further comprises a processor 202. In the non-limiting example shown in FIG. 2, processor 202 is a low-energy microcontroller, such as the ATMEGA328P by Atmel Corporation. According to other embodiments, processor 615 is the processor provided in other processing platforms, such as the processors provided by tablets, notebook or server computers.

In the non-limiting example shown in FIG. 2, the moulding section 102 includes a memory 204. According to certain embodiments, memory 204 is a non-transitory memory containing program code to implement, for example, generation and transmission of control instructions, networking functionality and the algorithms for generating and analyzing locations, presence, and/or tracks, described herein.

Additionally, according to certain embodiments, the moulding section 102 includes the network interface 206, which supports communication between the moulding section 102 and other devices in a network context in which smart building control using directional occupancy sensing is being implemented according to embodiments of this disclosure. In the non-limiting example shown in FIG. 2, network interface 206 includes circuitry 635 for sending and receiving data using Wi-Fi, including, without limitation at 900 MHz, 2.8 GHz and 5.0 GHz. Additionally, network interface 206 includes circuitry, such as Ethernet circuitry 640 for sending and receiving data (for example, smart floor tile data) over a wired connection. In some embodiments, network interface 206 further comprises circuitry for sending and receiving data using other wired or wireless communication protocols, such as Bluetooth Low Energy or Zigbee circuitry.

Additionally, according to certain embodiments, network interface 206 which operates to interconnect the moulding device 102 with one or more networks. Network interface 206 may, depending on embodiments, have a network address expressed as a node ID, a port number or an IP address. According to certain embodiments, network interface 206 is implemented as hardware, such as by a network interface card (NIC). Alternatively, network interface 206 may be implemented as software, such as by an instance of the java.net.NetworkInterface class. Additionally, according to some embodiments, network interface 206 supports communications over multiple protocols, such as TCP/IP as well as wireless protocols, such as 3G or Bluetooth. Network interface 206 may be in communication with the central communication device 120 in FIG. 1.

Figure 3:
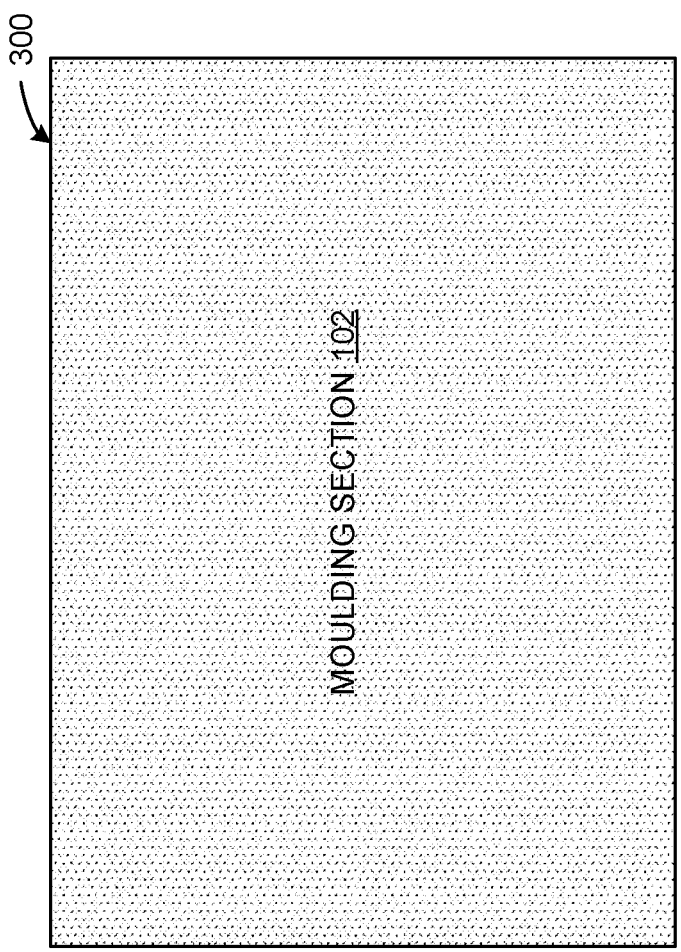
FIG. 3 illustrates an example backside view of a moulding section according to certain embodiments of this disclosure.

FIG. 3 illustrates an example backside view 300 of a moulding section 102 according to certain embodiments of this disclosure. As depicted by the dots 300, the backside of the moulding section 102 may include a fire-retardant backing layer positioned between the moulding section 102 and the wall to which the moulding section 102 is secured.

Figure 4:
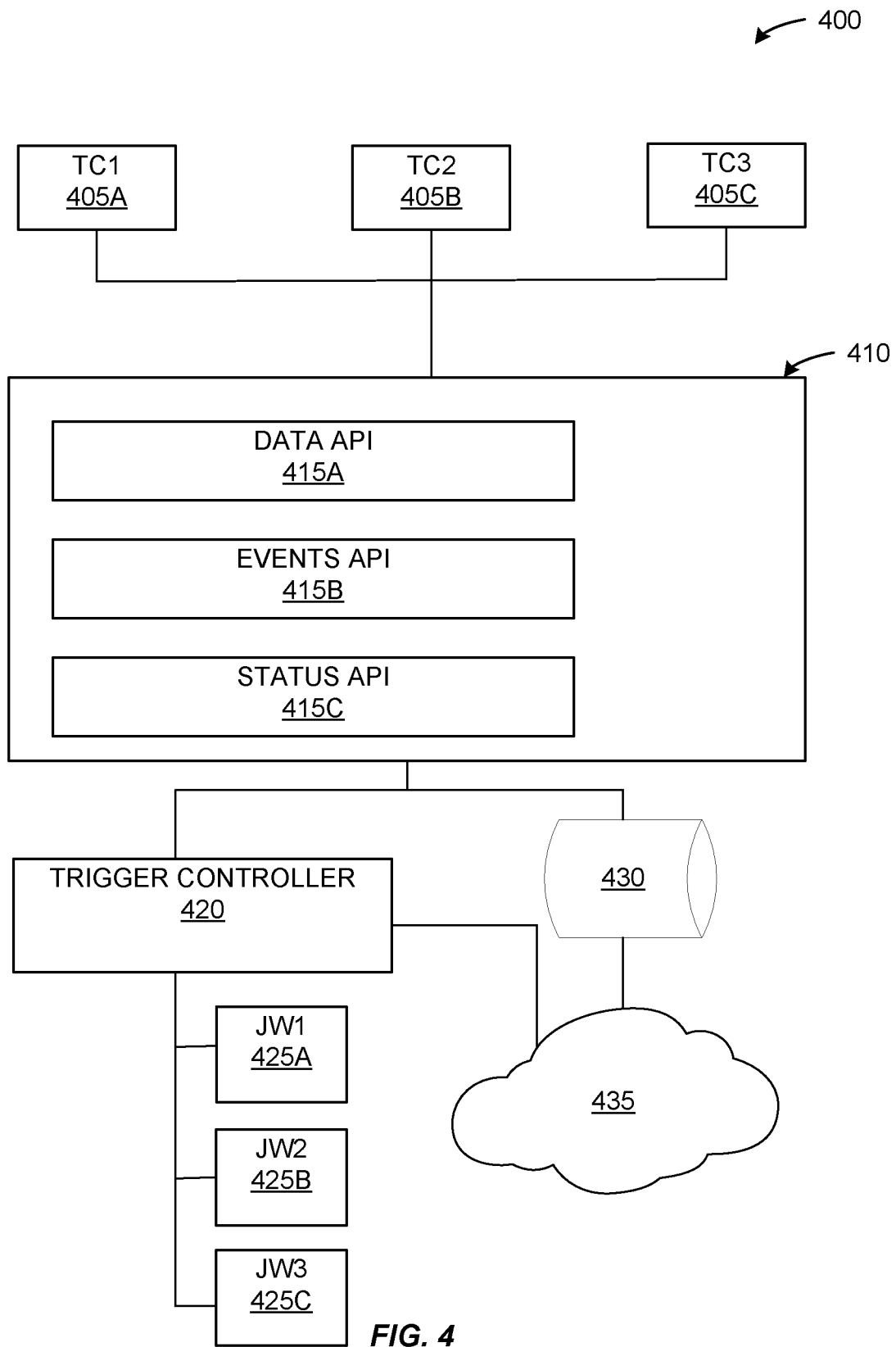
FIG. 4 illustrates a network and processing context for smart building control using directional occupancy sensing according to certain embodiments of this disclosure.

FIG. 4 illustrates a network and processing context 400 for smart building control using directional occupancy sensing according to certain embodiments of this disclosure. The embodiment of the network context 400 shown in FIG. 4 is for illustration only and other embodiments could be used without departing from the scope of the present disclosure.

In the non-limiting example shown in FIG. 4, a network context 400 includes one or more tile controllers 405A, 405B and 405C, an API suite 410, a trigger controller 420, job workers 425A-425C, a database 430 and a network 435.

According to certain embodiments, each of tile controllers 405A-405C is connected to a smart floor tile in a physical space. Tile controllers 405A-405C generate floor contact data from smart floor tiles in a physical space and transmit the generated floor contact data to API suite 410. In some embodiments, data from tile controllers 405A-405C is provided to API suite 410 as a continuous stream. In the non-limiting example shown in FIG. 4, tile controllers 405A-405C provide the generated floor contact data from the smart floor tile to API suite 410 via the internet. Other embodiments, wherein tile controllers 405A-405C employ other mechanisms, such as a bus or Ethernet connection to provide the generated floor data to API suite 410 are possible and within the intended scope of this disclosure.

According to some embodiments, API suite 410 is embodied on a server computer connected via the internet to each of tile controllers 405A-405C. According to some embodiments, API suite is embodied on a master control device, such as master control device 600 shown in FIG. 6 of this disclosure. In the non-limiting example shown in FIG. 4, API suite 410 comprises a Data Application Programming Interface (API) 415A, an Events API 415B and a Status API 215C.

In some embodiments, Data API 415A is an API for receiving and recording tile data from each of tile controllers 405A-405C. Tile events include, for example, raw, or minimally processed data from the tile controllers, such as the time and data a particular smart floor tile was pressed and the duration of the period during which the smart floor tile was pressed. According to certain embodiments, Data API 415A stores the received tile events in a database such as database 430. In the non-limiting example shown in FIG. 4, some or all of the tile events are received by API suite 410 as a stream of event data from tile controllers 405A-405C, Data API 415A operates in conjunction with trigger controller 420 to generate and pass along triggers breaking the stream of tile event data into discrete portions for further analysis.

According to various embodiments, Events API 415B receives data from tile controllers 405A-405C and generates lower-level records of instantaneous contacts where a sensor of the smart floor tile is pressed and released.

In the non-limiting example shown in FIG. 4, Status API 415C receives data from each of tile controllers 405A-405C and generates records of the operational health (for example, CPU and memory usage, processor temperature, whether all of the sensors from which a tile controller receives inputs is operational) of each of tile controllers 405A-405C. According to certain embodiment, status API 415C stores the generated records of the tile controllers' operational health in database 430.

According to some embodiments, trigger controller 420 operates to orchestrate the processing and analysis of data received from tile controllers 405A-405C. In addition to working with data API 415 a to define and set boundaries in the data stream from tile controllers 405A-405C to break the received data stream into tractably sized and logically defined "chunks" for processing, trigger controller 420 also sends triggers to job workers 425A-425C to perform processing and analysis tasks. The triggers comprise identifiers uniquely identifying each data processing job to be assigned to a job worker. In the non-limiting example shown in FIG. 4, the identifiers comprise: 1.) a sensor identifier (or an identifier otherwise uniquely identifying the location of contact); 2.) a time boundary start identifying a time in which the smart floor tile went from an idle state (for example, an completely open circuit, or, in the case of certain resistive sensors, a baseline or quiescent current level) to an active state (a closed circuit, or a current greater than the baseline or quiescent level); and 3.) a time boundary end defining the time in which a smart floor tile returned to the idle state.

In some embodiments, each of job workers 425A-425C corresponds to an instance of a process performed at a computing platform, (for example, master control device 105 in FIG. 1) for determining tracks and performing an analysis of the tracks. Instances of processes may be added or subtracted depending on the number of events or possible events received by API suite 410 as part of the data stream from tile controllers 405A-205C. According to certain embodiments, job workers 425A-425C perform an analysis of the data received from tile controllers 405A-405C, the analysis having, in some embodiments, two stages. A first stage comprises deriving paths, or tracks from tile impression data. A second stage comprises characterizing those paths according to a certain criteria to, inter alia, provide metrics to an online dashboard (in some embodiments, provided by a UI on an electronic device, such as electronic device 150 in FIG. 1) and to generate control signals for devices (e.g., the electronic device 150 in FIG. 1, such as HVAC systems, lights, and internet of things "IoT" appliances) controlling operational parameters of a physical space where the smart floor tile impressions were recorded.

In the non-limiting example shown in FIG. 4, job workers 425A-425C perform the constituent processes of a method for analyzing smart floor tile impressions and/or moulding section sensor data to generate paths, or tracks. According to certain embodiments, the method comprises the operations of obtaining impression data and/or moulding section sensor data from database 430, cleaning the obtained impression data and/or moulding section sensor data and reconstructing paths using the cleaned data. In some embodiments, cleaning the data includes removing extraneous sensor data, removing gaps between impressions and/or moulding section sensor data caused by sensor noise, removing long impressions and/or moulding section sensor data caused by objects placed on smart floor tiles, by objects placed in front of moulding sections, by defective sensors, and sorting impressions and/or moulding section sensor data by start time to produce sorted impressions and/or moulding section sensor data. According to certain embodiments, job workers 425A-425C perform processes for reconstructing paths by implementing algorithms that first cluster impressions and/or moulding section sensor data that overlap in time or are spatially adjacent. Next, the clustered data is searched, and pairs of impressions and/or moulding section sensor data that start or end within a few milliseconds of one another are combined into footsteps and/or locations of the object, which are then linked together to form footsteps and/or locations. Footsteps and/or locations are further analyzed and linked to create paths.

According to certain embodiments, database 430 provides a repository of raw and processed smart floor tile impression data and/or moulding section sensor data, as well as data relating to the health and status of each of tile controllers 405A-405C and moulding sections 102. In the non-limiting example shown in FIG. 4, database 430 is embodied on a server machine communicatively connected to the computing platforms providing API suite 410, trigger controller 420, and upon which job workers 425A-425C execute. According to other embodiments, database 430 is embodied on a cloud computing platform.

In the non-limiting example shown in FIG. 4, the computing platforms providing trigger controller 420 and database 430 are communicatively connected to one or more network(s) 435. According to embodiments, network 435 comprises any network suitable for distributing tile data, determined paths and control signals based on determined paths, including, without limitation, the internet or a local network (for example, an intranet) of a smart building.

Smart floor tiles utilizing a variety of sensing technologies, such as membrane switches, pressure sensors and capacitive sensors, to identify instances of contact with a floor are within the contemplated scope of this disclosure. FIG. 5 illustrates aspects of a resistive smart floor tile 500 according to certain embodiments of the present disclosure. The embodiment of the resistive smart floor tile 500 shown in FIG. 5 is for illustration only and other embodiments could be used without departing from the scope of the present disclosure.

In the non-limiting example shown in FIG. 5, a cross section showing the layers of a resistive smart floor tile 500 is provided. According to some embodiments, the resistance to the passage of electrical current through the smart floor tile varies in response to contact pressure. From these changes in resistance, values corresponding to the pressure and location of the contact may be determined. In some embodiments, resistive smart floor tile 500 may comprise a modified carpet or vinyl floor tile, and have dimensions of approximately 2'×2'.

According to certain embodiments, resistive smart floor tile 500 is installed directly on a floor, with graphic layer 505 comprising the top-most layer relative to the floor. In some embodiments, graphic layer 505 comprises a layer of artwork applied to smart floor tile 500 prior to installation. Graphic layer 505 can variously be applied by screen printing or as a thermal film.

According to certain embodiments, a first structural layer 510 is disposed, or located, below graphic layer 505 and comprises one or more layers of durable material capable of flexing at least a few thousandths of an inch in response to footsteps or other sources of contact pressure. In some embodiments, first structural layer 510 may be made of carpet, vinyl or laminate material.

According to some embodiments, first conductive layer 515 is disposed, or located, below structural layer 510. According to some embodiments, first conductive layer 515 includes conductive traces or wires oriented along a first axis of a coordinate system. The conductive traces or wires of first conductive layer 515 are, in some embodiments, copper or silver conductive ink wires screen printed onto either first structural layer 510 or resistive layer 520. In other embodiments, the conductive traces or wires of first conductive layer 515 are metal foil tape or conductive thread embedded in structural layer 510. In the non-limiting example shown in FIG. 5, the wires or traces included in first conductive layer 515 are capable of being energized at low voltages on the order of 5 volts. In the non-limiting example shown in FIG. 5, connection points to a first sensor layer of another smart floor tile or to tile controller are provided at the edge of each smart floor tile 500.

In various embodiments, a resistive layer 520 is disposed, or located, below conductive layer 515. Resistive layer 520 comprises a thin layer of resistive material whose resistive properties change under pressure. For example, resistive layer 320 may be formed using a carbon-impregnated polyethylete film.

In the non-limiting example shown in FIG. 5, a second conductive layer 525 is disposed, or located, below resistive layer 520. According to certain embodiments, second conductive layer 525 is constructed similarly to first conductive layer 515, except that the wires or conductive traces of second conductive layer 525 are oriented along a second axis, such that when smart floor tile 500 is viewed from above, there are one or more points of intersection between the wires of first conductive layer 515 and second conductive layer 525. According to some embodiments, pressure applied to smart floor tile 500 completes an electrical circuit between a sensor box (for example, tile controller 425 as shown in FIG. 4) and smart floor tile, allowing a pressure-dependent current to flow through resistive layer 520 at a point of intersection between the wires of first conductive layer 515 and second conductive layer 525.

In some embodiments, a second structural layer 530 resides beneath second conductive layer 525. In the non-limiting example shown in FIG. 5, second structural layer 530 comprises a layer of rubber or a similar material to keep smart floor tile 500 from sliding during installation and to provide a stable substrate to which an adhesive, such as glue backing layer 535 can be applied without interference to the wires of second conductive layer 525.

The foregoing description is purely descriptive and variations thereon are contemplated as being within the intended scope of this disclosure. For example, in some embodiments, smart floor tiles according to this disclosure may omit certain layers, such as glue backing layer 535 and graphic layer 505 described in the non-limiting example shown in FIG. 5.

According to some embodiments, a glue backing layer 535 comprises the bottom-most layer of smart floor tile 500. In the non-limiting example shown in FIG. 5, glue backing layer 535 comprises a film of a floor tile glue.

Figure 6:
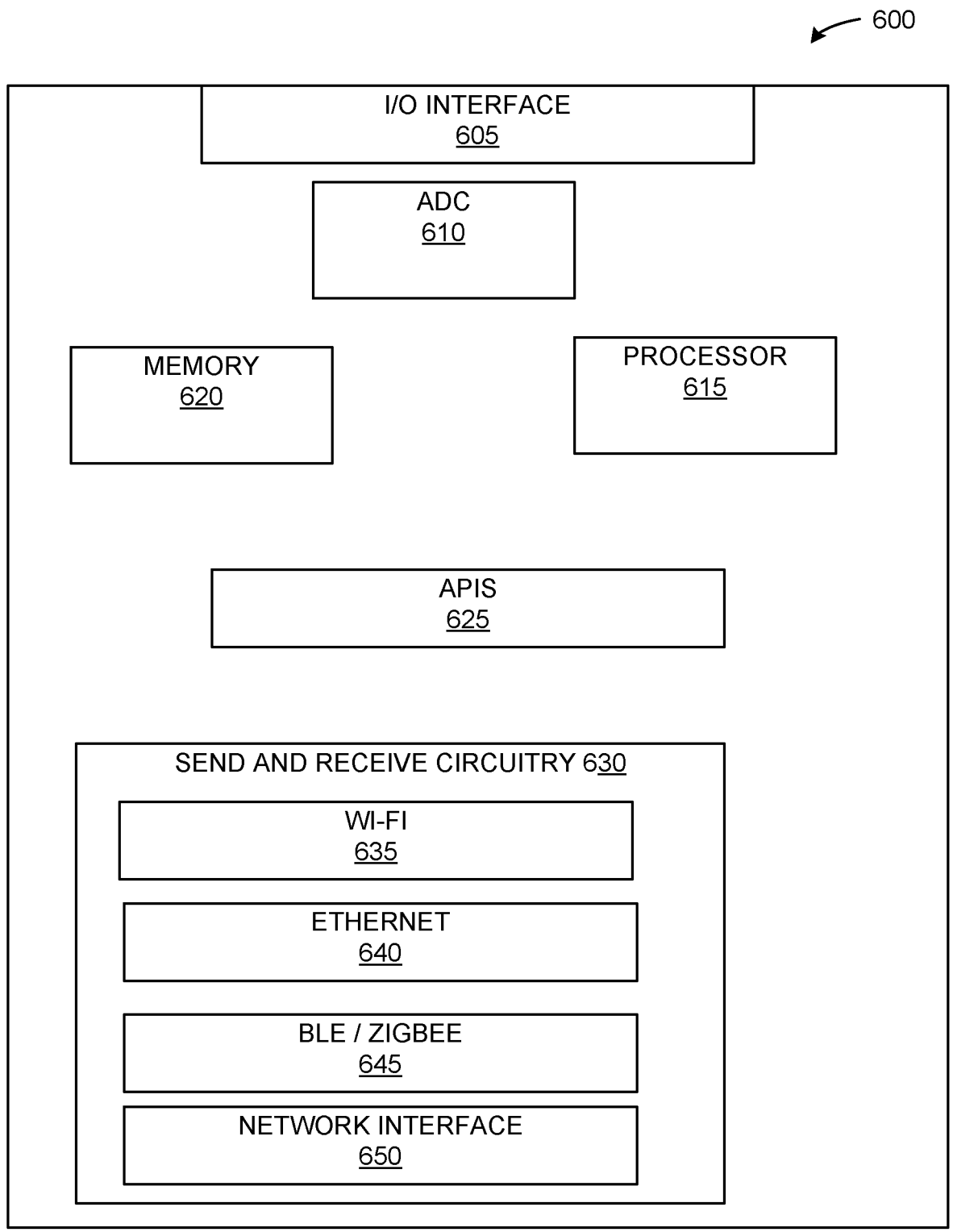
FIG. 6 illustrates a master control device according to certain embodiments of this disclosure.

FIG. 6 illustrates a master control device 600 according to certain embodiments of this disclosure. FIG. 6 illustrates a master control device 600 according to certain embodiments of this disclosure. The embodiment of the master control device 600 shown in FIG. 6 is for illustration only and other embodiments could be used without departing from the scope of the present disclosure.

In the non-limiting example shown in FIG. 6, master control device 600 is embodied on a standalone computing platform connected, via a network, to a series of end devices (e.g., tile controller 405A in FIG. 4) in other embodiments, master control device 600 connects directly to, and receives raw signals from, one or more smart floor tiles (for example, smart floor tile 500 in FIG. 5).

According to certain embodiments, master control device 600 includes one or more input/output interfaces (I/O) 605. In the non-limiting example shown in FIG. 6, I/O interface 605 provides terminals that connect to each of the various conductive traces of the smart floor tiles deployed in a physical space. Further, in systems where membrane switches or smart floor tiles are used as mat presence sensors, I/O interface 605 electrifies certain traces (for example, the traces contained in a first conductive layer, such as conductive layer 515 in FIG. 5) and provides a ground or reference value for certain other traces (for example, the traces contained in a second conductive layer, such as conductive layer 525 in FIG. 5). Additionally, I/O interface 605 also measures current flows or voltage drops associated with occupant presence events, such as a person's foot squashing a membrane switch to complete a circuit, or compressing a resistive smart floor tile, causing a change in a current flow across certain traces. In some embodiments, I/O interface 605 amplifies or performs an analog cleanup (such as high or low pass filtering) of the raw signals from the smart floor tiles in the physical space in preparation for further processing.

In some embodiments, master control device 600 includes an analog-to-digital converter ("ADC") 610. In embodiments where the smart floor tiles in the physical space output an analog signal (such as in the case of resistive smart floor tile), ADC 610 digitizes the analog signals. Further, in some embodiments, ADC 610 augments the converted signal with metadata identifying, for example, the trace(s) from which the converted signal was received, and time data associated with the signal. In this way, the various signals from smart floor tiles can be associated with touch events occurring in a coordinate system for the physical space at defined times. While in the non-limiting example shown in FIG. 6, ADC 610 is shown as a separate component of master control device 600, the present disclosure is not so limiting, and embodiments wherein ADC 610 is part of, for example, I/O interface 605 or processor 615 are contemplated as being within the scope of this disclosure.

In various embodiments, master control device 600 further comprises a processor 615. In the non-limiting example shown in FIG. 6, processor 615 is a low-energy microcontroller, such as the ATMEGA328P by Atmel Corporation. According to other embodiments, processor 615 is the processor provided in other processing platforms, such as the processors provided by tablets, notebook or server computers.

In the non-limiting example shown in FIG. 6, master control device 600 includes a memory 620. According to certain embodiments, memory 620 is a non-transitory memory containing program code to implement, for example, APIs 625, networking functionality and the algorithms for generating and analyzing tracks described herein.

Additionally, according to certain embodiments, master control device 600 includes one or more Application Programming Interfaces (APIs) 625. In the non-limiting example shown in FIG. 6, APIs 625 include APIs for determining and assigning break points in one or more streams of smart floor tile data and/or moulding section sensor data and defining data sets for further processing. Additionally, in the non-limiting example shown in FIG. 6, APIs 625 include APIs for interfacing with a job scheduler (for example, trigger controller 420 in FIG. 4) for assigning batches of data to processes for analysis and determination of tracks. According to some embodiments, APIs 625 include APIs for interfacing with one or more reporting or control applications provided on a client device. Still further, in some embodiments, APIs 625 include APIs for storing and retrieving smart floor tile data and/or moulding section sensor data in one or more remote data stores (for example, database 430 in FIG. 4).

According to some embodiments, master control device 600 includes send and receive circuitry 630, which supports communication between master control device 600 and other devices in a network context in which smart building control using directional occupancy sensing is being implemented according to embodiments of this disclosure. In the non-limiting example shown in FIG. 6, send and receive circuitry 630 includes circuitry 635 for sending and receiving data using Wi-Fi, including, without limitation at 900 MHz, 2.8 GHz and 5.0 GHz. Additionally, send and receive circuitry 630 includes circuitry, such as Ethernet circuitry 640 for sending and receiving data (for example, smart floor tile data) over a wired connection. In some embodiments, send and receive circuitry 630 further comprises circuitry for sending and receiving data using other wired or wireless communication protocols, such as Bluetooth Low Energy or Zigbee circuitry.

Additionally, according to certain embodiments, send and receive circuitry 630 includes a network interface 650, which operates to interconnect master control device 600 with one or more networks. Network interface 650 may, depending on embodiments, have a network address expressed as a node ID, a port number or an IP address. According to certain embodiments, network interface 650 is implemented as hardware, such as by a network interface card (NIC). Alternatively, network interface 650 may be implemented as software, such as by an instance of the java.net.NetworkInterface class. Additionally, according to some embodiments, network interface 650 supports communications over multiple protocols, such as TCP/IP as well as wireless protocols, such as 3G or Bluetooth.

The foregoing description, for purposes of explanation, used specific nomenclature to provide a thorough understanding of the described embodiments. However, it should be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It should be apparent to one of ordinary skill in the art that many modifications and variations are possible in view of the above teachings.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

The invention claimed is:

1. A system comprising:
a plurality of moulding sections located in a physical space, wherein the plurality of moulding sections comprise a plurality of sensors configured to obtain first sensor data, wherein the first sensor data corresponds to a location of an object;
at least one electrical conductor affixed at least partially within one or more of the plurality of moulding sections;
one or more joints between various ones of the plurality of moulding sections, at least some of the one or more joints arranged to preserve electrical conductivity, via the at least one electrical conductor between the various ones of the plurality of moulding sections; and
at least one smart floor tile located in the physical space, wherein:
the at least one electrical conductor is communicably connected to the at least one smart floor tile,
the at least one smart floor tile comprises a sensor configured to obtain second sensor data, the second sensor data corresponds to the location of the object, the first sensor data and the second sensor data are used to perform smart building control, a determination is made whether the first sensor data and the second sensor data align, and a control action is performed in response to determining the first sensor data and second sensor data differ.

2. The system of claim 1, wherein at least one of the at least one electrical conductors is positioned in electrical communication with a power supply.

3. The system of claim 1, wherein at least one of the at least one electrical conductors is configured for wired data transmission.

4. The system of claim 1, wherein at least one of the at least one electrical conductors is substantially enclosed within one or more of the plurality of moulding sections.

5. The system of claim 1, wherein at least one of the at least one electrical conductors comprises an insulated electrical wiring assembly.

6. The system of claim 1, wherein at least one of the at least one electrical conductors comprises a communications cable assembly.

7. The system of claim 1, further comprising a fire-retardant backing layer positioned between at least one of the plurality of moulding sections and a wall.

8. The system of claim 1, wherein various ones of the plurality of moulding sections are constructed using one or more materials selected from: solid wood, vinyl, rubber, fiberboard, and wood composite materials.

9. The system of claim 1, wherein at least one of the plurality of moulding sections comprises one or more of: a baseboard, a shoe moulding, a crown moulding, a door casing, and a window casing.

10. The system of claim 1, further comprising one or more electrical conductors affixed at least partially within one or more of the plurality of moulding sections.

11. A system comprising:

a plurality of moulding sections located in a physical space, wherein the plurality of moulding sections comprise a plurality of sensors configured to obtain first sensor data, wherein the first sensor data corresponds to a location of an object;

at least one communication cable affixed at least partially within one or more of the plurality of moulding sections;

one or more joints between various ones of the plurality of moulding sections, at least some of the one or more joints arranged to preserve communications connectivity, via the at least one electrical conductor between the various ones of the plurality of moulding sections; and at least one smart floor tile located in the physical space, wherein:

the at least one electrical conductor is communicably connected to the at least one smart floor tile, the at least one smart floor tile comprises a sensor configured to obtain second sensor data, the second sensor data corresponds to the location of the object, the first sensor data and the second sensor data are used to perform smart building control using directional occupancy sensing, a determination is made whether the first sensor data and the second sensor data align, and a control action is performed in response to determining the first sensor data and second sensor data differ.

12. The system of claim 11, wherein at least one of the at least one communication cables comprises a fiber optic cable.

13. The system of claim 12, wherein at least one of the one or more joints comprises a fiber optic relay.

14. The system of claim 11, wherein at least one of the at least one communication cables is configured for wired data transmission.

15. The system of claim 11, wherein at least one of the at least one communication cables is substantially enclosed within one or more of the plurality of moulding sections.

16. The system of claim 11, further comprising a fire-retardant backing layer positioned between at least one of the plurality of moulding sections and a wall.

17. The system of claim 11, wherein various ones of the plurality of moulding sections comprise a fire-retardant material.

* * * * *